United States Patent [19]

Galimberti et al.

[11] Patent Number: 5,369,186

[45] Date of Patent: Nov. 29, 1994

[54] ALPHA OLEFINS FUNCTIONALIZED POLYMERS

[75] Inventors: Maurizio Galimberti; Umberto Giannini, both of Milan; Romano Mazzocchi, Novara; Enrico Albizzati, Novara; Umberto Zucchini, Ferrara, all of Italy

[73] Assignee: Himont Incorporated, Wilmington, Del.

[21] Appl. No.: 790,630

[22] Filed: Nov. 12, 1991

[30] Foreign Application Priority Data

Nov. 13, 1990 [IT] Italy .................. 22039 A/90

[51] Int. Cl.$^5$ .................. C08F 214/16; C08F 226/06; C08F 8/26
[52] U.S. Cl. .................. 525/330.7; 525/366; 526/291; 526/262; 526/318.3; 526/318.6; 526/324; 526/331; 526/332; 526/339; 526/348.4
[58] Field of Search ............ 526/291, 262, 318.3, 526/318.6, 324, 331, 332, 348.4, 339; 525/330.7

[56] References Cited

U.S. PATENT DOCUMENTS

| | | | |
|---|---|---|---|
| 3,492,277 | 1/1990 | Clark . | |
| 3,796,687 | 3/1974 | Collette et al. | 526/313 |
| 4,518,757 | 5/1985 | Schulz et al. | 526/329 |
| 4,523,929 | 6/1985 | Duvdevani et al. | 44/62 |
| 4,586,937 | 5/1986 | Duvdevani et al. | 44/62 |
| 4,602,077 | 7/1986 | Cecchin et al. | 526/339 |
| 4,734,472 | 3/1988 | Chung | 526/239 |

FOREIGN PATENT DOCUMENTS

| | | |
|---|---|---|
| 0171025 | 2/1986 | European Pat. Off. . |
| 0274912 | 7/1988 | European Pat. Off. . |
| 2145762 | 2/1973 | France . |
| 3446781 | 7/1985 | Germany . |
| 58-196220 | 2/1984 | Japan . |
| 57-152767 | 3/1984 | Japan . |
| 57-188996 | 5/1984 | Japan . |
| 1060365 | 3/1967 | United Kingdom . |

OTHER PUBLICATIONS

R. T. Morrison and R. N. Boyd, Organic Chemistry, 3rd Ed, p. 21 Allyn and Bacon, Inc., Boston, 1973.

*Primary Examiner*—Joseph L. Schofer
*Assistant Examiner*—Mark Nagumo

[57] ABSTRACT

Disclosed are polymers and copolymers of $CH_2=CHR$ alpha olefins where R is hydrogen or a 1-6 carbon atom alkyl radical, containing in the chain from 0.1 to 40 mole % of monomeric units $$-CH_2-CH- \\ \phantom{-CH_2-}| \\ \phantom{-CH_2-}X$$

where X is selected from the group consisting of $(CH_2)_rCH_2CH_2Y$ $(CH_2)_rCH=CH_2 \quad (CH_2)_{r+2}OCOR^1$ $(CH_2)_{r+2}OR^1 \quad (CH_2)_{r+2}CH(COOR^1)_2$ $(CH_2)_{r+2}OH \quad (CH_2)_{r+2}CH_2COOH$

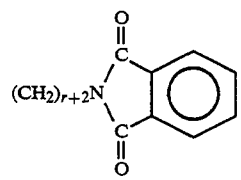

where r=0–10, Y is a halogen atom, $R^1$ is a hydrocarbon radical with 1-18 carbon atoms.

2 Claims, No Drawings

ALPHA OLEFINS FUNCTIONALIZED POLYMERS

The present invention relates to alpha-olefin copolymers containing, inserted in the chain, monomeric units derived from halogenated α-olefins, and the functionalized polymers obtained from said alpha-olefin copolymers containing halogenated α-olefins by means of dehydrohalogenation reactions, or substitution of the halogen atoms with functional groups.

It is known that the introduction of functional groups in the olefin polymers can improve their chemical-physical properties, such as gas impermeability, compatibility to polar polymers, adhesiveness to metals, dyeability. Also it is known how difficult it is to prepare olefin copolymers with functionalized monomers containing nitrogen or oxygen atoms, by using Ziegler-Natta catalysts. The preferred interaction of the Lewis acids present in such catalysts with the heteroatoms of the polar monomer causes the poisoning and deactivation of the catalytic sites. As cited in the literature, the copolymerization of α-olefins with polar monomers requires either a pretreatment of the polar monomer with an organometallic Al compound, as in U.S. Pat. No. 3,492,277 (1970), or the use of monomers containing ester groups, less reactive with Ziegler-Natta catalysts, (Japanese applications 57-152767, 57-188996, 57-188997 and U.S. Pat No. 4,518,757). The content of linked ester groups is less than 5% moles, and higher levels can only be reached by using esters which are particularly hindered. Said processes are carried out under particular conditions, such as long polymerization times; the corresponding free acids are then obtained by hydrolysis of the ester groups (U.S. Pat. No. 4,523,929 and U.S. Pat. No. 4,586,937).

Functionalized polymers obtained by Ziegler-Natta catalysts are described in U.S. Pat. No. 4,734,472, where α-ω-dienes, previously reacted with boranes, are used as monomers. Further treatments of said intermediate polymers bring about the final polymers containing —OH, —CHO, —COOH, and —NH₂ groups.

Another way of introducing polar groups is to graft unsaturated polar molecules to pre-formed polyolefins in the presence of peroxides; however polymers containing low amounts of non-homogeneously distributed polar groups are generally obtained according to this technique.

Now it has been found that it is possible to introduce monomeric units containing functional groups in the chain of polymers and copolymers of $CH_2=CHR$ olefins where R is hydrogen or a 1-6 carbon alkyl radical, by starting with copolymers of said alpha olefins containing units distributed in the chain, that are derived from halo-olefins, and then dehydrohalogenating or substituting the halogen atom with a functional group.

In particular, the present invention relates to a polymer of $CH_2=CHR$ α-olefins where R is hydrogen or a 1-6 carbon atom alkyl radical, that contains in the chain up to 40 mole % of monomer units of the formula $$-CH_2-CH-$$
$$|$$
$$X$$

wherein X is a radical selected from the group consisting of $(CH_2)_r CH_2CH_2Y$ $(CH_2)_r CH=CH_2$  $(CH_2)_{r+2}OCOR^1$ $(CH_2)_{r+2}OR^1$  $(CH_2)_{r+2}CH(COOR^1)_2$ $(CH_2)_{r+2}OH$  $(CH_2)_{r+2}CH_2COOH$

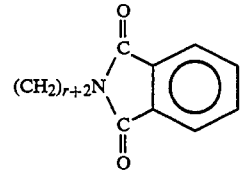

where $r=0-10$, Y is a halogen atom, $R^1$ is $C_{1-18}$ alkyl, $C_{3-18}$ cycloalkyl, $C_{6-18}$ aryl or $C_{7-18}$ aralkyl.

The content of the functionalized monomeric units in the (co)polymers can be from 0.1 to 40 moles %, preferably from 1 to 15 moles %.

The dehydrohalogenation reaction of said (co)polymers brings about the formation of double bonds while substitution of the halogen atoms by suitable reactions allows the introduction of functional groups, such as —OCOR, —OR, —OH, —COOR, —COOH, where R is a $C_1$-$C_{18}$ hydrocarbon radical.

The (co)polymers containing halogenated α-olefin units are prepared by polymerization, according to known methods, of a $CH_2=CHR$ olefin or mixtures thereof with halogenated α-olefins, in the presence of Ziegler-Natta type catalyst systems obtained from transition metal compounds of groups IV to VIII of the Periodic System, preferably vanadium or titanium, and organo-aluminum compounds, preferably trialkylaluminum compounds or dialkylaluminum halides.

When starting with elastomeric terpolymers of ethylene and propylene with 1-iodo-3-butene, the dehydrohalogenation reaction on the copolymer brings about the formation of ethylene/propylene/butadiene terpolymers where the butadiene units are exclusively of the 1,2 enchainment type, that is, all the butadiene units are bonded at carbon atoms 1 and 2 to the terpolymer chains.

The preparation of terpolymers containing iodobutene is carried out by polymerizing ethylene, propylene, and iodobutene mixtures according to known methods. In particular, the preparation of ethylene-propylene elastomeric copolymers is carried out preferably by catalysts obtained from vanadium compounds, such as vanadium acetylacetonate and Al-dialkyl halides. Iodobutene units are found homogeneously distributed in the chains of the thus obtained terpolymers.

Elastomeric terpolymers usually obtained by polymerizing ethylene, propylene and butadiene, wherein butadiene units are mainly bonded through carbon atoms 1 and 4, are known in the art. Due to the (1,4) enchainment the butadiene units causes such terpolymers to have double bonds inserted in the chains and therefore to have low resistance to oxidation and particularly to ozone.

Elastomeric terpolymers comprising from 30 to 70% by moles of ethylene, 70 to 30% of propylene, and up to 15% of 1,2 enchainment butadiene, can be easily obtained according to the present invention and represent a new class of highly ozone resistant elastomers.

Furthermore, according to the present invention, by copolymerizing propylene with iodobutene in the presence of stereospecific catalyst systems, and then subjecting the copolymers obtained to dehydrohalogenation, new highly crystalline polymers containing 1,2-butadiene units can be also obtained.

For example, it is possible to obtain polymers having a high isotactic index (higher than 90%). It is known to polymerize propylene and butadiene by catalysts obtained from titanium halides supported on magnesium chloride, and from aluminum alkyls in the presence of Lewis bases. However in such copolymers butadiene units are only partially of the 1,2-enchainment type (U.S. Pat. No. 4,602,077).

As above mentioned, another object of the present invention is the preparation of polyolefins containing functional groups by substitution reaction of halogen atoms in the α-olefin/halogenated α-olefin copolymers with suitable organic metal salts, for instance organic alkaline metal salts.

The halogen atom, particularly the iodine atom substitution reaction is carried out according to known techniques, for example by dissolving the polymer in an aliphatic, a cycloaliphatic, or preferably an aromatic hydrocarbon, and reacting the polymer with an organic salt of an alkaline metal, preferably potassium, used in large excess with respect to the iodine atoms and solubilized in the reaction medium with crown ethers and optionally with aliphatic alcohols such as butyl alcohol.

Examples of suitable crown ethers are: 1,4,7,10,13,16-hexaoxacyclooctadecane (18-crown-6); 2,3,11,12-dibenzo-1,4,7,10,13,16-hexaoxacyclooctadeca-2,11-diene (dibenzo-18-crown-6); 2,3,11,12-dicyclohexyl-1,4,7,10,13,16-hexaoxacyclooctadecane (dicyclohexyl-18-crown-6).

For instance, in order to substitute iodine atoms with —OR, —OCOR, —N(CO)$_2$C$_6$H$_4$, —CH(COOR)$_2$ containing groups, the corresponding potassium salts can be used: potassium t-butoxide, potassium acetate, potassium phenoxide, potassium phthalimide, potassium ethylmalonate.

The functionalized polymers of the invention, thanks to their improved performances of permeability, compatibility, adhesion and dyeability, can be usefully employed, for instance, for the production of gas-barrier films and sheets, food packaging films, anticorrosive metal coatings and compatibilizing components for polyolefin blends, for instance with polyamides, polyesters, polyphenylene ethers.

The following examples are given to illustrate and not limit the invention.

EXAMPLES 1–10

(Preparation of ethylene/propylene/1-iodo-3-butene terpolymers)

Into a 2 liter glass autoclave heated at the desidered temperature, toluene, 1-iodo-3-butene, V(acetylacetonate)$_3$ and AlEt$_2$I were introduced under nitrogen flow. A continuous constant ratio ethylene/propylene flow was then introduced.

Table 1 shows the data relative to the polymerization. At the end of the reaction the polymer was precipitated from the solution by methanol addition.

EXAMPLES 11–21

(Preparation of propylene/1-iodo-3-butene copolymers)

Into a 2 liter glass autoclave heated at the desired temperature, were introduced under nitrogen flow heptane and the mixture of Al-alkyl and silane (external donor).

Iodobutene was added, and then, under propylene atmosphere, the solid catalyst component, prepared by grinding the MgCl$_2$ together with ethylbenzoate and subsequent reaction at 80° C. with TiCl$_4$ in excess.

Propylene pressure was then raised to the desired level. Polymerization data are reported in Table 2. The polymer was isolated after excess methanol addition.

EXAMPLES 22–42

(Dehydrohalogenation and Substitution Reaction of Iodine Atom in Iodobutene Copolymers)

Polymers obtained from examples 1–10 were dissolved in toluene at 90° C. and a t-C$_4$H$_9$OK/toluene solution together with the 18-crown-6 ether are then added (examples 22–30). Polymers from examples 11–21 were dissolved in boiling toluene or xylene and the toluene solution of potassium compound and 18-crown-6 ether was then added (examples 31–42). The reaction was stopped by methanol addition. Reaction conditions and results obtained are shown in Tables 3, 4 and 5.

Other features, advantages and embodiments of the invention disclosed herein will be readily apparent to those exercising ordinary skill after reading the foregoing disclosure.

In this regard, while specific embodiments of the invention have been described in considerable detail, variations and modifications of these embodiments can be effected without departing from the spirit and scope of the invention as described and claimed.

TABLE 1

| | EXAMPLES Examples No. | | | | | | | | | |
|---|---|---|---|---|---|---|---|---|---|---|
| | 1 | 2 | 3 | 4 | 5 | 6 | 7 | 8 | 9 | 10 |
| V(acac)$_3$ (mg) | 30 | 30 | 37 | 480 | 510 | 520 | 540 | 570 | 540 | 515 |
| AlEt$_2$I (mM) | 2.3 | 2.3 | 23 | 46 | 46 | 46 | 46 | 46 | 46 | 46 |
| Al/V | 27 | 27 | 32 | 33 | 31.5 | 30.9 | 29.7 | 28.2 | 29.7 | 31.1 |
| Iodobutene (ml) | 1.6 | 1.6 | 8 | 16 | 16 | 16 | 13 | 12.5 | 12.5 | 16 |
| Solvent (ml) | 60 | 40 | 400 | 800 | 800 | 800 | 800 | 800 | 800 | 800 |
| C$_3$/C$_2$ (molar ratio) | 2.6 | 2.6 | 2 | 0.5 | 0.5 | 0.5 | 0.5 | 0.5 | 0.48 | 0.5 |
| Pressure (atm) | 4 | 4 | 4 | 4 | 4 | 4 | 4 | 4 | 4 | 4 |
| Flow C$_2$/C$_3$ (l/min) | — | — | 0.5 | 2 | 2 | 2 | 2 | 2 | 2 | 2 |
| Polymer (g) | 0.68 | 0.81 | 7 | 11.3 | 13.2 | 16.3 | 18.7 | 21 | 20 | 15.7 |
| Temperature (°C.) | 35 | 35 | 44–45 | 44–47 | 45–47 | 45–47 | 45–47 | 46–48 | 46–47 | 45–47 |
| Reaction time (h) | 2 | 2 | 2 | 3.5 | 2 | 2 | 2 | 2 | 2 | 2 |
| C$_3$ in the polymer (% weight) | 63 | n.d | 40 | 43.6 | 41.4 | 37.8 | 35 | 37.5 | 35.4 | 39.8 |
| I in the polymer (% weight) | 10.0 | 14.6 | 5 | 4.48 | 4.57 | 4.79 | 3.73 | 4.05 | 4.30 | 4.47 |
| (η THN 135° C.) (dl/g) | n.d | n.d | n.d | 2.65 | 2.35 | 2.55 | 2.60 | 2.62 | 2.50 | 2.40 |

TABLE 2

EXAMPLES

| Examples No. | 11 | 12 | 13 | 14 | 15 | 16 | 17 | 18 | 19 | 20 | 21 |
|---|---|---|---|---|---|---|---|---|---|---|---|
| Solid Catalyst Component (mg) | 23.1 | 19.1 | 24.2 | 52.0 | 21.8 | 59.2 | 116.2 | 256.7 | 286.6 | 2401.0 | 22 |
| AlEt$_3$ (mM) | 2.3 | 2.3 | 2.3 | 2.3 | 2.3 | 2.3 | 2.3 | 8.6 | 5.8 | 49.2 | 1.5 |
| Diphenyldimethoxysilane (% in moles on ALEt$_3$) | 5 | 5 | 5 | 5 | 5 | 5 | 5 | 5 | 5 | 5 | — |
| Al/Ti | 238.5 | 288.0 | 227.6 | 105.9 | 252.7 | 93.0 | 47.4 | 80.2 | 48.5 | 48.5 | 163.3 |
| Iodobutene (ml) | — | 0.5 | 1.0 | 1.0 | 1.5 | 1.5 | 1.5 | 1.5 | 3.75 | 31.5 | 1 |
| Heptane (ml) | 40 | 40 | 40 | 40 | 40 | 40 | 40 | 40 | 100 | 840 | 60 |
| C$_3$ (atm) | 4 | 4 | 4 | 4 | 4 | 4 | 4 | 4 | 4 | 4 | 4 |
| Temperature (°C.) | 60 | 60 | 60 | 60 | 60 | 60 | 60 | 60 | 60 | 60 | 58 |
| Reaction Time (min) | 120 | 120 | 120 | 120 | 120 | 120 | 120 | 120 | 120 | 120 | 120 |
| Polymer (g) | 17.60 | 0.91 | 0.73 | 1.50 | 0.37 | 1.48 | 2.55 | 2.81 | 7.90 | 49.0 | 1.12 |
| I in the polymer (% W) | — | 1.73 | 3.1 | 2.52 | 3.79 | 2.87 | 2.78 | 2.63 | 2.50 | 2.96 | 3.00 |
| Melting Point (°C.) | 159 | 152.9 | 150.9 | 152.8 | 150.3 | 150.0 | n.d. | 149.4 | 151.2 | 148.8 | n.d. |
| Inherent viscosity Tetralin at 135° C. (dl/g) | n.d. | n.d. | n.d. | n.d. | n.d. | n.d. | n.d. | n.d. | 1.05 | 1.07 | n.d. |

TABLE 3

EXAMPLES

| Examples No. | 22 | 23 | 24 | 25 | 26 | 27 | 28 | 29 | 30 |
|---|---|---|---|---|---|---|---|---|---|
| Polymer of example n° | 1 | 2 | 3 | 4 | 5 | 6 | 7 | 8 | 9 |
| Polymer (g) | 0.62 | 0.25 | 6.2 | 11.1 | 12.8 | 15.8 | 18.5 | 19.6 | 18.2 |
| Solution Concentration g/l | 4.2 | 2.5 | 1.6 | 1.8 | 1.7 | 2.1 | 2.5 | 2.6 | 2.4 |
| t.bu O$^-$K$^+$ (mg) | 300 | 166 | 3.8 | 9.6 | 5.2 | 6.6 | 11 | 12.7 | 12.4 |
| $\frac{\text{t·buO}^-\text{K}^+}{\text{Iodio}}$ (moles) | 5.6 | 6.5 | — | — | — | — | — | — | — |
| 18-crown-6 (mg) | 28.8 | 13 | 0.3 | 0.74 | 0.41 | 0.51 | 0.87 | 1.0 | 0.98 |
| $\frac{\text{t·buO}^-\text{K}^+}{\text{18-crown-6}}$ (moles) | 24.3 | 30 | 29.9 | 30.2 | 30.5 | 30.5 | 30 | 30 | 29.8 |
| Reaction Time (h) | 24 | 24 | 8 | 7.5 | 6 | 6.5 | 6 | 6 | 6 |
| Iodine before (%) | 9.7 | 11.6 | 5.0 | 4.86 | 4.57 | 4.79 | 3.73 | 4.05 | 4.30 |
| Iodine after (%) | 0.8 | 0.45 | 0.3 | 0.3 | 0.3 | 0.3 | 0.3 | 0.3 | 0.3 |
| C$_4^=$ content after reaction (% W) | 3.6 | 4.15 | 1.0 | 1.5 | 1.6 | 1.6 | 1.2 | 1.4 | 1.2 |

TABLE 4

| Ex. No. | Polymer Example | mg | conc. in toluene (g/l) | reagent | (mg) | reag/iodine moles | 18-crown-6 (mg) | reag/18-c-6 moles | T (°C.) | Time (h) | W % Iodine Before reaction | W % Iodine After reaction |
|---|---|---|---|---|---|---|---|---|---|---|---|---|
| 31 | 10 | 575 | 1.8 | Kacetate | 650.8 | 30.1 | 341.1 | 5.1 | 90 | 18 | 4.76 | |
|    |    |     |     |          | 650.0 |      | 366.0 | 4.8 | 90 | 6  |      | 0.3 |
| 32 | 10 | 520.8 | 2.6 | Kbenzoate | 857.8 | 27 | 755.7 | 1.9 | 100 | 18 | 4.76 | |
|    |    |     |     |          | 456.6 |    | 453.5 | 1.7 | 100 | 6  |      | 1.24 |
| 33 | 10 | 244.2 | 1.2 | Kphenate | 370.0 | 30.4 | 151.1 | 4.9 | 100 | 16 | 4.76 | |
|    |    |     |     |          | 350.2 |      | 151.1 | 4.6 | 100 | 8  |      | 0.1 |
| 34 | 10 | 467.3 | 1.9 | Kphthalimide | 720.3 | 26.3 | 264.5 | 3.9 | 100 | 16 | 4.76 | |
|    |    |     |     |          | 680.5 |      | 264.5 | 3.7 | 100 | 8  |      | 1.45 |
| 35 | 10 | 253.3 | 0.8 | Kdiethylmalonate | 280 | 15.7 | 371 | 1 | 90 | 20 | 4.76 | |
|    |    |     |     |          | 280 |      | 371 | 1 | 90 | 6  |      | 0.13 |

TABLE 5

| Ex. No. | Polymer Example n. | mg | Solvent | conc. sol. g/l | reagent | (mg) | reag/iodine moles | 18-crown-6 (mg) | reag/18-c-6 moles | T (°C.) | Time (h) | W % Iodine Before | W % Iodine After |
|---|---|---|---|---|---|---|---|---|---|---|---|---|---|
| 36 | 21 | 328.7 | Toluene | 1.6 | Kacetate | 229.5 | 30.2 | 113.5 | 5.4 | 95 | 15 | 3.0 | 1.05 |
|    |    |       |         |     |          | 240.5 |      | 113.5 | 5.7 | 100 | 9  |     |      |
| 37 | 13 | 275.2 | Xylene  | 1.4 | Kacetate | 197.8 | 30.1 | 266.3 | 2.0 | 120 | 17 | 3.1 | 0.1 |
|    |    |       |         |     |          | 198   |      | 266.3 | 2.0 | 120 | 9  |     |     |
| 38 | 21 | 85.0  | Toluene | 0.4 | Kphenate | 81.1  | 30.5 | 37.8  | 4.4 | 95  | 15 | 3.0 | 0.02 |
|    |    |       |         |     |          | 82.9  |      | 37.8  | 4.5 | 95  | 7  |     |      |
| 39 | 13 | 229.1 | Toluene | 0.76 | Kphthalimide | 311 | 30.1 | 128.5 | 3.5 | 95 | 17 | 3.1 | 1.97 |
|    |    |       |         |     |          | 211 |      | 128.5 | 3.5 | 95 | 7  |     |     |
| 40 | 14 | 300.0 | Xylene  | 1.2 | Kphthalimide | 331.4 | 30.1 | 236.6 | 2.0 | 120 | 17 | 2.52 | 0.22 |
|    |    |       |         |     |              | 331.4 |      | 236.6 | 2.0 | 120 | 8  |      |      |

TABLE 5-continued

| Ex. No. | Polymer Example n. | mg | Solvent | conc. sol. g/l | reagent | reagent (mg) | reag/iodine moles | 18-crown-6 (mg) | reag/18-c-6 moles | T (°C.) | Time (h) | W % Iodine Before | W % Iodine After |
|---|---|---|---|---|---|---|---|---|---|---|---|---|---|
| 41 | 19 | 250.0 | Toluene | 0.83 | Kdiethylmalonate | 159.1 | 16.4 | 195.0 | 1.1 | 113 | 16 | 2.5 | 0.02 |
|  |  |  |  |  |  | 159.0 |  | 195.0 | 1.1 | 113 | 7 |  |  |
| 42 | 14 | 310.0 | Toluene | 1.6 | Kdiethylmalonate | 112.0 | 9.3 | 65.0 | 2.3 | 113 | 17 | 2.52 | 0.13 |
|  |  |  |  |  |  | 94.0 |  | 65.0 | 1.9 | 113 |  |  |  |

We claim:

1. An elastomeric copolymer of ethylene and propylene, that contains 30–70 mole % of ethylene units, and 70–30 mole % of propylene units, with 1–15 mole % of the ethylene units having a radical selected from the group consisting of —$CH_2$-$CH_2$I, —CH=$CH_2$, —$CH_2$—$CH_2$—CH(COOR$^1$)$_2$, and

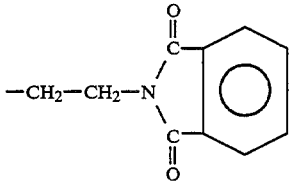

wherein $R^1$ is $C_{1-18}$ alkyl, $C_{3-18}$ cycloalkyl, $C_{6-18}$ aryl or $C_{7-18}$ aralkyl, and R is $C_1$–$C_{18}$ hydrocarbyl.

2. A copolymer according to claim 1, wherein said radical is —CH=$CH_2$, and there are no double bonds in the polymer chains.

* * * * *